United States Patent
Cai et al.

(10) Patent No.: US 12,250,265 B1
(45) Date of Patent: Mar. 11, 2025

(54) CONFIGURING AD HOC CONTENT SERVERS BASED ON SERVER LOAD LIMITS

(71) Applicant: T-Mobile USA, Inc., Bellevue, WA (US)

(72) Inventors: Zheng Cai, Fairfax, VA (US); Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/499,187

(22) Filed: Oct. 31, 2023

(51) Int. Cl.
*G06F 15/173* (2006.01)
*H04L 67/1008* (2022.01)
*H04L 67/1021* (2022.01)
*H04L 67/63* (2022.01)

(52) U.S. Cl.
CPC ...... *H04L 67/1008* (2013.01); *H04L 67/1021* (2013.01); *H04L 67/63* (2022.05)

(58) Field of Classification Search
CPC .. H04L 67/1008; H04L 67/63; H04L 67/1021
USPC ........................................................ 709/226
See application file for complete search history.

(56) References Cited

U.S. PATENT DOCUMENTS

| | | | |
|---|---|---|---|
| 10,182,033 B1* | 1/2019 | Farhangi | H04L 43/16 |
| 11,005,929 B1* | 5/2021 | Chamarajanagar | H04L 47/125 |
| 2006/0190603 A1* | 8/2006 | Anzai | H04L 67/1029 |
| | | | 709/226 |
| 2007/0124476 A1* | 5/2007 | Oesterreicher | H04L 67/1012 |
| | | | 709/226 |
| 2010/0217801 A1* | 8/2010 | Leighton | H04L 67/289 |
| | | | 709/224 |
| 2020/0076766 A1* | 3/2020 | Maslak | H04L 61/5007 |
| 2024/0106886 A1* | 3/2024 | Roy | H04L 67/1029 |

* cited by examiner

*Primary Examiner* — Alan S Chou
(74) *Attorney, Agent, or Firm* — Foley IP Law, PLLC

(57) ABSTRACT

A computerized method configures and uses ad hoc servers to serve content. A content server configured to serve a content dataset periodically provides a current server load notification to a domain name server (DNS). Upon detecting that a current load of the content server exceeds a server load threshold, the DNS sends a new server setup notification to the content server. The content server then identifies an ad hoc server and performs a content service handover to the identified ad hoc server. Upon completion of the content service handover, the content server provides a new server notification to the DNS indicating that the identified ad hoc server is ready to serve the content dataset. The DNS is thereby enabled to divert client requests for the content dataset to the ad hoc server during the period that the current load of the content server exceeds the server load threshold.

20 Claims, 6 Drawing Sheets

CONFIGURING AD HOC CONTENT SERVERS BASED ON SERVER LOAD LIMITS

BACKGROUND

Content servers are deployed by content providers. Domain name servers (DNSs) provide connection data to clients for use in connecting to the content servers. In some situations, there is high demand for content of a content server in a particular geographic location, such that the content server of that content is overloaded with client demand. It is challenging to ensure that there are sufficient content servers in many geographic locations as deploying content servers is potentially costly and content server location is fixed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for configuring and using ad hoc servers to serve content is described. A content server configured to serve a content dataset periodically provides a current server load notification to a domain name server (DNS). The DNS monitors the server load of the content server and, upon detecting that a current load of the content server meets or exceeds a server load threshold, the DNS sends a new server setup notification to the content server. The content server then identifies an ad hoc server and performs a content service handover to the identified ad hoc server. Upon completion of the content service handover, the content server provides a new server notification to the DNS indicating that the identified ad hoc server is ready to serve the content dataset. The DNS is thereby enabled to divert client requests for the content dataset to the ad hoc server during the period that the current load of the content server meets or exceeds the server load threshold.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Figure 1:
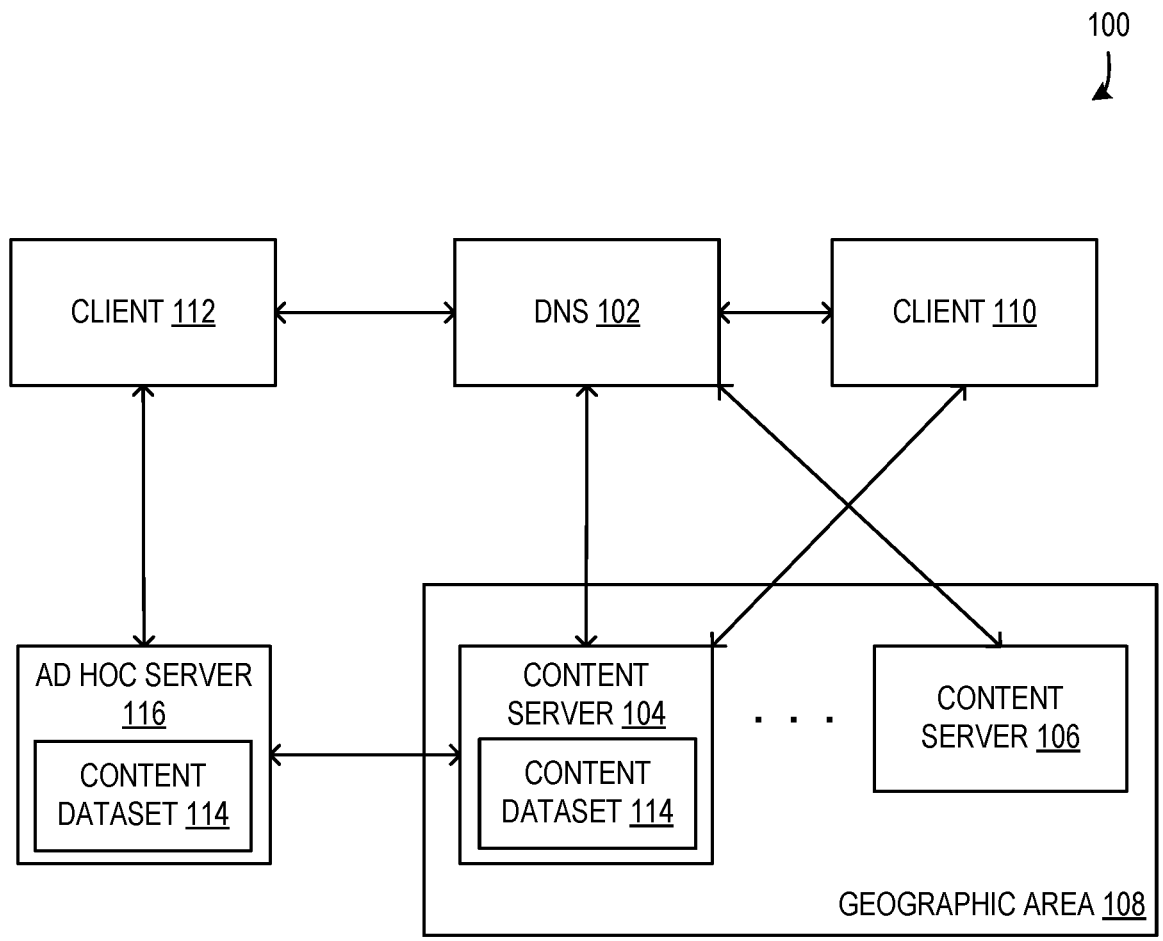
FIG. 1 is a block diagram illustrating a system configured for using ad hoc servers to serve content datasets to clients.

Aspects of the disclosure provide systems and methods for monitoring the server loads of content servers and triggering the configuration of ad hoc servers associated with content servers that have server loads that meet or exceed a server load threshold. A DNS server receives notifications of server load from the content servers in a geographic location. If the server load of a content server meets or exceeds a server load threshold, the DNS instructs the content server to set up a new ad hoc server that will be used to take on some of the client demand for the content being served by the content server. The content server identifies an ad hoc server from a group of potential ad hoc servers and performs a content service handover process, during which the identified ad hoc server is configured to serve the content of the content server in response to client requests for that content. Upon completion of the content service handover, the content server provides connection data of the ad hoc server to the DNS and the DNS begins to route content requests to the ad hoc server instead of to the content server with threshold-exceeding server load. Thus, the content server is prevented from becoming overloaded by client demand for the content. Later, when the server load of the content server is reduced, the DNS may begin routing client requests to the content server again and release the ad hoc server from its role as an ad hoc server for the client server.

The disclosure operates in an unconventional manner, at least by monitoring the server load with the DNS. The disclosure enables the DNS to track active ad hoc servers and route client requests thereto, thereby ensuring that those clients receive timely responses to those requests. In other examples, those requests are routed to a content server that becomes overloaded with the demand and is unable to provide timely responses to all the requesting clients.

Further, the disclosure improves the efficiency of the use of server resources of the described system. The dynamic configuration and use of ad hoc servers based on detected client demand reduces the need for servers to be dedicated to specific content to handle peaks in demand that are relatively rare. Instead, servers in the system are maintained as potential ad hoc servers that can be configured to serve various content as required by demand dynamically. Thus, server resources are less likely to be left unused while other servers' resources are pushed to their limits.

Additionally, the disclosure optimizes the use of geographically close content server resources in response to geographically specific client demand. In some examples, the disclosure selects ad hoc servers to use by selecting the ad hoc server that is compatible and that is in close proximity to the geographic region of the content server by which the ad hoc server is being configured. Thus, the time and resource costs associated with communication between clients and servers that are geographically distant are minimized or reduced.

FIG. 1 is a block diagram illustrating a system 100 configured for using an ad hoc server 116 to serve a content dataset 114 to a client 112. In some examples, the system 100 includes a domain name server (DNS) 102 that receives requests from clients 110-112 and provides connection data of content servers 104-106 to those clients 110-112 in response to the requests. Further, the DNS 102 receives or otherwise obtains server load information from the content servers 104-106 and uses the server load information to monitor current server loads of the content servers 104-106. If the DNS 102 determines that a content server 104 has a current server load that exceeds a server load threshold, the DNS 102 instructs the content server 104 to configure an ad hoc server 116 to serve the content dataset 114 being served by the content server 104. Upon receiving a notification that the configuration of the ad hoc server 116 is complete, the DNS 102 provides connection data of the ad hoc server 116 to a client 112 that requests access to the content dataset 114, thereby preventing the original content server 104 from being overloaded by client requests.

Further, in some examples, the system 100 includes one or more computing devices (e.g., the computing apparatus of FIG. 6) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the DNS 102 is executed on a first computing device and the content server 104 is located on a second computing device within the system 100. The first computing device and second computing device are configured to communicate with each other via network connections. Alternatively, in some examples, other components of the DNS 102 (e.g., a component that receives and processes client requests and a component that receives server load information from the content servers 104-106 and monitors associated current server loads) are executed on separate computing devices and those separate computing devices are configured to communicate with each other via network connections during the operation of the DNS 102. In other examples, other organizations of computing devices are used to implement system 100 without departing from the description.

The DNS 102 includes hardware, firmware, and/or software configured to receive and process requests from client devices (e.g., clients 110-112). In some examples, the DNS 102 receives a request from a client 110 that includes a domain name of a website or other data source from which the client 110 is requesting a content dataset and/or a service. For instance, in an example, a user of the client 110 activates a hyperlink for a website in a browser of the client 110 and the client 110 sends a request to the DNS 102 that includes a domain name and/or other website information associated with the activated hyperlink. The DNS 102 includes or otherwise has access to a map or other data structure that associates domain names with one or more network addresses (e.g., Internet Protocol (IP) addresses) of content servers (e.g., content servers 104-106). It should be understood that the DNS 102 is further configured to operate as a DNS among a network of other DNSs without departing from the description. For instance, in some examples, the DNS 102 receives or otherwise obtains updated associations between domain name data entries and network addresses of associated servers and the DNS 102 incorporates those updated associations into the associated data structure, such that the updated associations are used to direct client traffic as described herein.

Further, in some examples, the DNS 102 is configured to receive or otherwise obtain current server load data from the content servers 104-106. In some such examples, the content servers 104-106 are configured to periodically send current server load notifications to the DNS 102 and the DNS 102 records or logs current server load data of the current server load notifications for each of the content servers 104-106.

Additionally, in some examples, the DNS 102 stores or has access to one or more server load thresholds (e.g., a threshold defined as a quantity of client connections and/or a threshold defined as a percentage of a maximum server load capacity). The DNS 102 is configured to compare the current server load data received from the content servers 104-106 to the one or more server load thresholds. If a content server 104 has a current server load data that indicates its current load meets or exceeds a server load threshold, the DNS 102 is configured to instruct the content server 104 to identify and configure an ad hoc server 116 to handle future requests for the content dataset 114 or other services provided by the content server 104. In some examples, the DNS 102 includes multiple server load thresholds that are compared to current server load data of different content servers and/or different types of content servers without departing from the description.

The content servers 104-106 include hardware, firmware, and/or software configured to serve content datasets (e.g., content dataset 114) to requesting clients 110-112 and/or otherwise provide services to requesting clients 110-112. It should be understood that, in some examples, the content servers 104-106 are configured to serve data and/or otherwise respond to requests from clients 110-112 over network connections that are facilitated by the DNS 102. The content servers 104-106 are configured to include specific content datasets 114 or otherwise provide a specific set of services to requesting clients, including serving data associated with displaying or otherwise providing website data, serving data associated with data files, an audio stream, and/or a video stream, or the like. While many examples herein describe the serving of the content dataset 114 by the content server 104 and/or the ad hoc server 116, in other examples, the content server 104 and associated ad hoc server 116 are configured to provide a different type of data or service to clients 110-112 in response to requests without departing from the description.

In some examples, a set of content servers 104-106 are located in and/or associated with a geographic area 108. Further, the system 100 is configured to direct requests by clients 110-112 in or near the geographic area 108 to the content data servers 104-106 in that geographic area 108. Such geography-based routing reduces the time needed for network signals to travel between entities in the network and, as a result, improves the response time of the system 100 to client requests generally. However, as described herein, the use of geography-based traffic routing can result in traffic bottlenecks and/or reduced performance of the system 100 when demand for the content served by the content servers 104-106 is substantially high (e.g., when a popular event is occurring in the geographic area 108 and many clients request to view a video stream of the event). When such an increased demand event occurs, the system 100 is configured to identify and configure an ad hoc server 116 to respond to requests for the demanded content dataset 114 as described herein.

The clients 110-112 include hardware, firmware, and/or software configured to communicate with the DNS 102, the content servers 104-106, and/or the ad hoc server 116 over one or more networks. Further, the clients 110-112 are configured to send requests for addresses of content servers 104-106 and/or ad hoc server 116 to the DNS 102 and to send requests for content and/or services to content servers 104-106 and/or ad hoc server 116. Additionally, or alternatively, clients 110-112 are computing devices that enable interactions with users, such as providing information to users and/or receiving information from users via one or more user interfaces (UIs). For instance, in an example, the client 110 is a personal computer (PC) that includes a web browser program and that displays website information to a user using a screen interface and that receives web navigation information from the user using a keyboard, mouse, and/or other UIs. Additionally, or alternatively, in some examples, the clients 110-112 include more and/or different client devices without departing from the description, such as other server devices, mobile devices such as smartphones or tablets, smart home devices such as smart televisions (TVs) or streaming devices, and/or other types of computing devices such as laptop computers or home media servers.

The ad hoc server 116 includes hardware, firmware, and/or software configured to serve content datasets (e.g., content dataset 114) to requesting clients 110-112 and/or otherwise provide services to requesting clients 110-112, as described above with respect to content servers 104-106. In some examples, the ad hoc server 116 is a server that is similar or the same as the content servers 104-106 but it is located outside of the geographic area 108. In some such examples, the DNS 102 and content servers 104-106 in the geographic area 108 are configured to work together to balance the traffic load for the geographic area 108 across the content servers 104-106 therein using load balancing techniques. However, in some cases, increased demand events associated with the geographic area 108 result in client demand that exceeds the capacity of the content servers 104-106 in that geographic area 108, necessitating the identification and configuration of an ad hoc server 116 that is outside of that set of content servers 104-106.

In some such examples, the ad hoc server 116 is part of a group of content servers associated with a different geographic area (e.g., an adjacent or otherwise nearby geographic area). Alternatively, or additionally, the ad hoc server 116 is a different type of server that happens to have some amount of free load capacity that can be repurposed for use in serving the content dataset 114 associated with the content server 104 as described herein.

In some examples, the content server 104 is instructed or otherwise notified by the DNS 102 to identify and configure an ad hoc server 116 (e.g., a new server setup notification as described herein). The content server 104 identifies the ad hoc server 116 from a pool or other data structure of potential ad hoc servers. In some examples, the pool of potential ad hoc servers includes the other content servers associated with nearby geographic areas. Further, the identification of the ad hoc server 116 in the pool of potential ad hoc servers includes comparing characteristics of the ad hoc server 116 to requirements associated with serving the content dataset 114. In some such examples, the requirements include data storage capacity requirements, data processing requirements, network performance requirements, and/or available load capacity requirements. This process is described further below at least with respect to FIG. 2.

Further, in some examples, the content server 104 configures the ad hoc server 116 to serve the content dataset 114. In some such examples, this process includes sending the content dataset 114 to the ad hoc server 116 and/or otherwise providing the ad hoc server 116 with access to the content dataset 114. Additionally, or alternatively, the content server 104 provides information associated with how to respond to requests from clients associated with the content dataset 114. This process is described further below at least with respect to FIG. 2.

Figure 2:
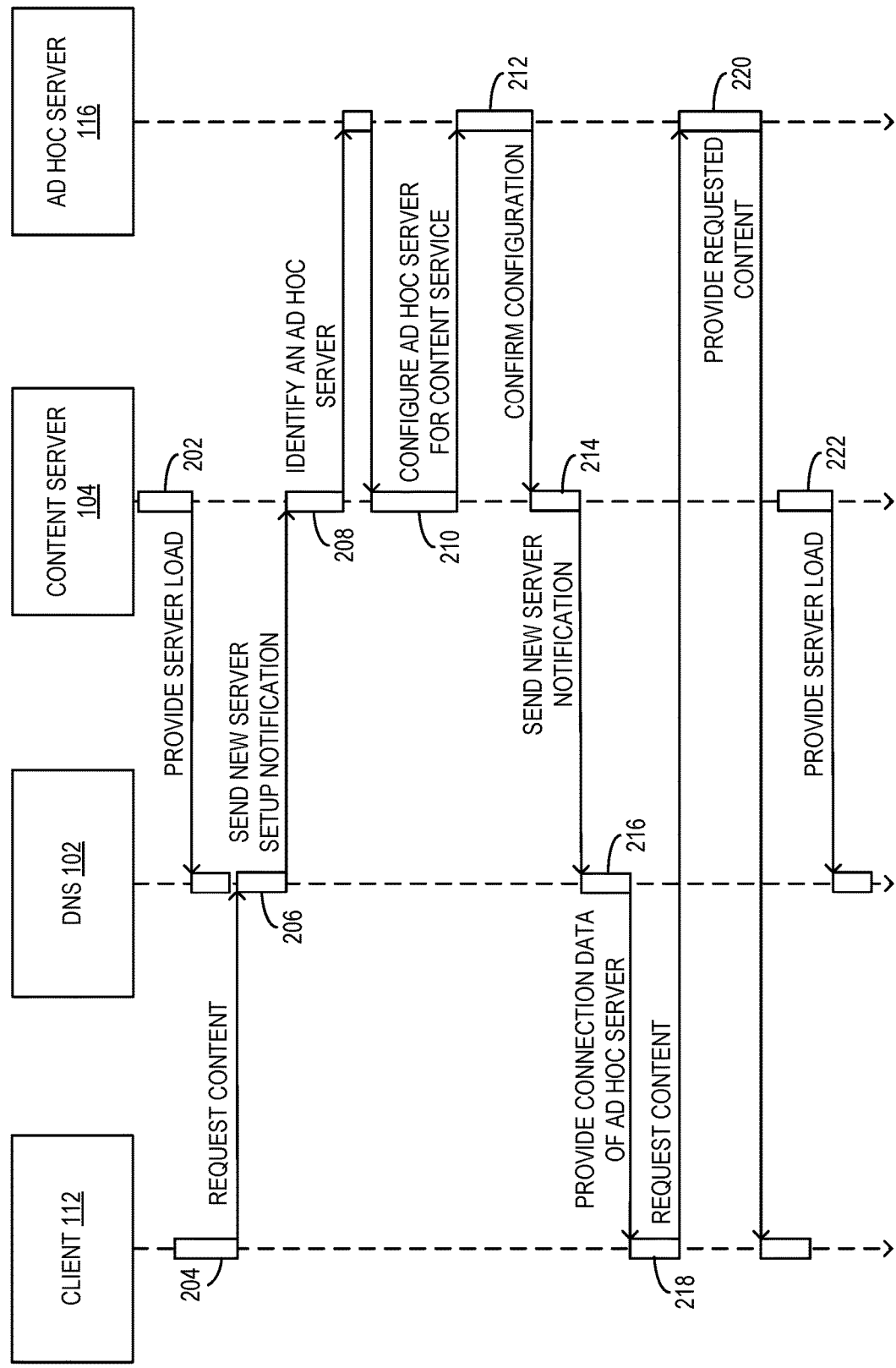
FIG. 2 is a sequence diagram illustrating a process for configuring and using an ad hoc server to serve content to a client.

FIG. 2 is a sequence diagram illustrating a process 200 for configuring and using an ad hoc server 116 to serve content to a client 112. In some examples, the process 200 is executed or otherwise performed in a system such as system 100 of FIG. 1.

At 202, the content server 104 provides a server load notification to the DNS 102. In some examples, the content server 104 is configured to provide a server load notification to the DNS 102 periodically, such that the DNS 102 is enabled to monitor the current and/or recent server load of the content server 104 and/or other content servers associated with the DNS 102. Further, in some examples, the provided server load notification includes data indicating the current server load of the content server 104, such as a quantity of current client connections, a data value indicating the quantity or percentage of bandwidth and/or other resources of the content server 104 being used to serve content to clients, or the like. The DNS 102 is configured to record the received server load data of the content server 104, which is then used to determine whether to send a new server setup notification as described herein.

At 204, the client 112 sends a content request to the DNS 102. The content request includes data identifying a content dataset that is being requested and/or data identifying a domain name and/or other associated data that indicates a source from which the content is being requested. The DNS 102 is configured to translate or map domain name data into server address data that can then be used by the client 112 to directly access the server that serves the requested content. However, the DNS 102 is configured to first determine whether the content server 104 of the requested content has sufficient available resources to connect with and serve the content to the client 112 without causing any network slowdowns or other performance issues.

At 206, the DNS 102 sends a new server setup notification to the content server 104 based on receiving the content request from the client 112. In some examples, the DNS 102 compares the most recently received server load data of the content server 104 to a defined server load threshold and, if the current server load meets or exceeds the defined server load threshold, the DNS 102 does not provide the address of the content server 104 to the client 112 and instead instructs the content server 104 to set up a new ad hoc server 116 to take on some of the load associated with requests for the content served by the content server 104. Alternatively, or additionally, in some examples, the DNS 102 sends the new server setup notification to the content server 104 and also provides the address of the content server 104 to the client 112, such that that client 112 is enabled to obtain the content from the content server 104, but future clients that request the content will provided the address data of the new ad hoc server 116 as described below. Thus, the client 112 is not made to wait for the ad hoc server configuration process to be completed before it receives a response from the DNS 102 to its request.

At 208, the content server 104 identifies an ad hoc server candidate in response to receiving a new server setup notification. In some examples, the content server 104 searches for the ad hoc server 116 from a list or other data structure of potential ad hoc servers. The potential ad hoc server information is provided to the content server 104 by the DNS 102 (e.g., as part of the new server setup notification) and/or the ad hoc server information is accessed from another source, such as a server dedicated to maintaining an up-to-date record of all potential ad hoc servers based on the servers' attributes, location, and/or current server load. In some such examples, the content server 104 identifies the ad hoc server 116 by determining a subset of potential servers that are capable of serving the content dataset of the content server 104 and selecting the ad hoc server 116 from that subset based on it being the geographically closest server or otherwise the server that is most likely to provide good content service performance. In some examples, the identification of the ad hoc server 116 by the content server 104 includes some exchange of data between the content server 104 and the ad hoc server 116 (e.g., the ad hoc server 116 provides current performance information and/or current server load information to the content server 104, which is used by the content server 104 in its identification of the new ad hoc server).

At 210, the content server 104 configures the ad hoc server 116 for content service. In some examples, the configuration process, or handover, to the ad hoc server 116 includes providing the ad hoc server 116 with the content dataset that is to be served, or otherwise providing the ad hoc server 116 with access to the content dataset to be served. Further, in some examples, the configuration process includes providing the ad hoc server 116 with metadata and/or instructions associated with operations the ad hoc server 116 is to perform and/or other ad hoc server 116 behavior in response to client requests for data and/or services. For instance, in an example, if the content served by the content server 104 includes the provision of multiple different services associated with the content, the ad hoc server 116 is configured to receive requests associated with the content, determine which service to perform from the set of multiple different services, and to perform that determined service in response to the received request. It should be understood that, in some examples, the serving of the content dataset and/or services associated therewith are performed by multiple content servers. In some such examples, the process described herein includes configuring a group of ad hoc servers 116 to serve the content dataset and/or provide services associated therewith, such that services provided by the ad hoc servers 116 are the same as the services that are provided by the associated content servers 104.

At 212, after the configuration of the ad hoc server 116 is complete, the ad hoc server 116 confirms the configuration to the content server 104 and, at 214, the content server 104 sends a new server notification to the DNS 102. In some examples, the new server notification includes address information and/or other identifying information of the ad hoc server 116, which the DNS 102 adds to the list of servers that serve the content of the content server 104. Thus, while the ad hoc server 116 is active, the DNS 102 is enabled to direct client traffic to the ad hoc server 116 in response to requests for the content for which the ad hoc server 116 has been configured.

At 216, the DNS 102 provides connection data of the ad hoc server 116 to the client 112 in response to the content request at 204. With the connection data, the client 112 is enabled to request the content from the ad hoc server 116 at 218 and, at 220, the ad hoc server 116 responds to the content request from the client 112 based on the prior configuration of the ad hoc server 116.

Later, and/or during other portions of the process 200, at 222, the content server 104 provides a server load notification to the DNS 102 again. In some examples, the new server load notification includes data that indicates that the current server load of the content server 104 is less than the defined server load threshold. In such examples, the DNS 102 and/or the content server 104 notify the ad hoc server 116 that client traffic will no longer be directed to it with respect to the content of the content server 104 and the DNS 102 resumes directing content traffic to the content server 104. Alternatively, if the current server load of the content server 104 still meets or exceeds the defined server load threshold, the DNS 102 continues to direct client traffic to the ad hoc server 116 as described herein. Alternatively, or additionally, after the ad hoc server 116 has been configured for serving the content of the content server 104, in some examples, it is maintained as an ad hoc server for a period of time after the server load of the content server 104 falls below the defined server load threshold. If the server load of the content server 104 climbs above the threshold again, the DNS 102 is enabled to direct traffic to the ad hoc server 116 again without performing the ad hoc server search and configuration as described herein. The period of time for which ad hoc server 116 is maintained as an ad hoc server for the content server 104 is a statically defined time period or it is based on the length of the period of time that the server load of the content server 104 remains at or above the server load threshold (e.g., if the content server 104 is above the server load threshold for a longer period of time, the ad hoc server 116 is maintained as an ad hoc server for a longer period of time as well). Thus, if the increase in requests to the content server 104 is a transient spike, the ad hoc server 116 is more quickly released for other uses, but if the increase in requests to the content server 104 lasts for a longer time, the ad hoc server 116 is maintained to handle an extended period of high volume of content requests. In other examples, the ad hoc server 116 is maintained and/or released using different methods without departing from the description.

Alternatively, or additionally, the process 200 operates based at least in part on other performance metrics of the content server 104, such as a latency metric (e.g., average latency of the content server 104 over a period of time). In other examples, other performance metrics include requests per second (RPS) metrics, server uptime metrics, server error rate metrics, server thread count metrics, system-level performance metrics (e.g., CPU usage, memory usage, disk usage), average response time (ART) metrics, peak response time (PRT) metrics, or the like. In such examples, the content server 104 provides the DNS 102 with a performance metric data and the DNS 102 compares that performance metric data to a server performance threshold. If the performance metric data indicates that the performance metric of the content server meets or exceeds the server performance threshold, the DNS 102 is configured to send a new server setup notification at 206, as described above. It should be understood that, in some such examples, the process 200 is performed as described above except for the sending and evaluation of performance metric data instead of or in addition to the server load data.

Further, in some such examples, the system 100 is used to perform and/or the process 200 includes a computerized method comprising providing, by a content server configured to serve a content dataset, a current server performance notification to a domain name server (DNS); receiving, by the content server, a new server setup notification based at least in part on the provided current server performance notification including an indication that a current performance metric of the content server exceeds a server performance threshold; identifying, by the content server, an ad hoc server; performing, by the content server, a content service handover to the identified ad hoc server; and providing, by the content server, a new server notification to the DNS indicating that the identified ad hoc server is ready to serve the content dataset, whereby the DNS is enabled to divert client requests for the content dataset to the identified ad hoc server during a period that the current performance metric of the content server exceeds the server performance threshold.

Further, in some examples, the computerized method comprises wherein identifying the ad hoc server includes: determining a group of potential ad hoc servers; filtering the group of potential ad hoc servers into a subset of potential ad hoc servers using at least one requirement associated with the content dataset; and identifying the ad hoc server in the subset of potential ad hoc servers based on at least one performance characteristic of the ad hoc server.

In some examples of the computerized method, the content server is located in a geographic region and the at least one performance characteristic of the ad hoc server includes a proximity of the ad hoc server to the geographic region.

In some examples of the computerized method, performing the content service handover to the identified ad hoc server includes: providing the content dataset to the content server; and configuring the ad hoc server to respond to requests for the content dataset.

In some examples of the computerized method, configuring the ad hoc server to respond to requests for the content dataset includes: configuring the ad hoc server to identify a request type of a request for the content dataset from a group of possible request types; and configuring the ad hoc server to provide a service associated with the identified request type from a group of possible services in response to the request of the identified request type.

In some examples of the computerized method, providing the current server performance notification to the DNS includes: monitoring, by the content server, the current performance metric of the content server, wherein the current performance metric is indicative of at least latency of the content server over a time period; and periodically sending, by the content server, the current server performance notification to the DNS including the monitored current performance metric of the content server.

In some examples, the computerized method further comprises: determining, by the content server, that the current performance metric of the content server is below the server performance threshold; and sending, by the content server, a notification to the DNS that the current performance metric of the content server is below the server performance threshold, whereby the DNS is enabled to route client requests for the content dataset to the content server and the ad hoc server is enabled to be freed of its ad hoc server role with respect to the content dataset of the content server.

Figure 3:
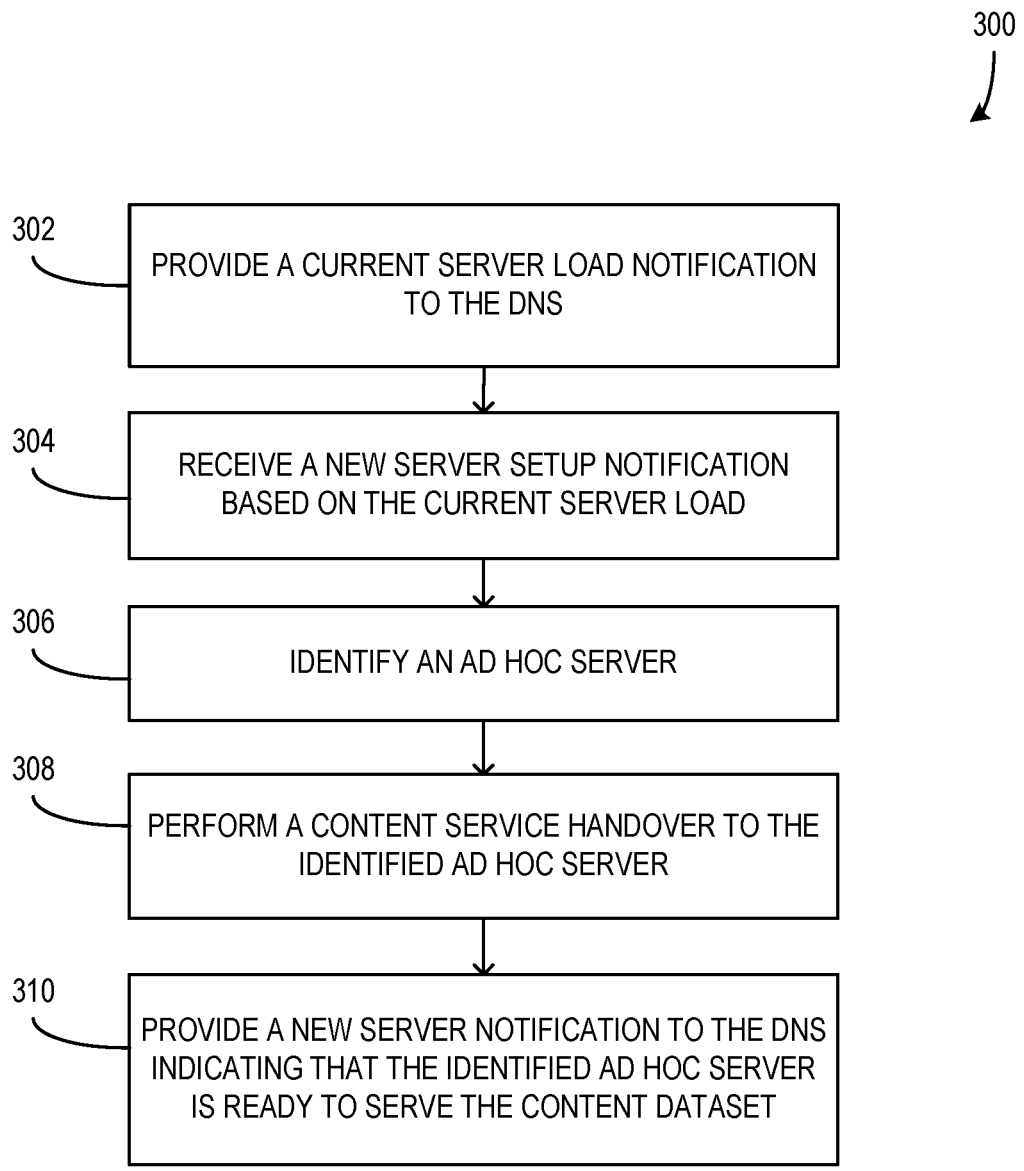
FIG. 3 is a flowchart illustrating a method for configuring, by a content server, an ad hoc server for serving a content dataset to a client.

FIG. 3 is a flowchart illustrating a method 300 for configuring, by a content server (e.g., content server 104), an ad hoc server (e.g., ad hoc server 116) for serving a content dataset (e.g., content dataset 114) to a client (e.g., client 112). In some examples, the method 300 is executed or otherwise performed in a system such as system 100 of FIG. 1 and/or by a content server such as content server 104 of FIG. 1.

At 302, the content server provides a current server load notification to the DNS. In some examples, the content server is one of multiple content servers that send current server load notifications to the DNS and the DNS is configured to receive and store the current server load information, using the information to monitor the current server loads of the multiple content servers as described herein. In some such examples, the current server load notification includes one or more server load indicators, such as a quantity of current client network connections, a quantity of current client requests being processed, a quantity of current bandwidth being used to serve content to clients, a percentage of total bandwidth being used to serve content to clients, or the like.

At 304, the content server receives a new server setup notification from the DNS based on the current server load. In some examples, the DNS is configured to send a new server setup notification to the content server upon determining that the current server load of the content server meets or exceeds a defined server load threshold as described herein. Additionally, or alternatively, the DNS is configured to send the new server setup notification when a client request for content from the content server is received and the DNS determines that the current server load of the content server meets or exceeds the defined server load threshold.

At 306, the content server identifies an ad hoc server. In some examples, the content server begins a search for a compatible ad hoc server upon receiving the new server setup notification. The search for the compatible ad hoc server includes determining a group of potential ad hoc servers and filtering that group of potential ad hoc servers using at least one requirement associated with the content dataset. In some such examples, the at least one requirement includes a data storage requirement associated with the content dataset (e.g., the ad hoc server must be able to store the content dataset), a bandwidth requirement associated with the content dataset (e.g., the ad hoc server must be able to serve the content dataset at a minimum defined data rate to clients), or the like. After the filtered subset of potential ad hoc servers is determined, the content server identifies the ad hoc server in that subset of potential ad hoc servers based on at least one performance characteristic of the ad hoc server. For instance, in an example, the content server selects the ad hoc server based on the ad hoc server being the closest server to the geographic region of the content server in the filtered subset of potential ad hoc servers. Other possible performance characteristics include average rates at which the potential ad hoc servers serve data, average rate of dropped or failed client connections, and/or the like.

At 308, the content server performs a content service handover to the identified ad hoc server. In some examples, the content service handover includes sending the content dataset to the ad hoc server and/or configuring the ad hoc server to enable the ad hoc server to properly respond to requests for the content dataset and/or specific portions of the content dataset. In some such examples, the content server is configured to respond to multiple types of requests associated with the content dataset (e.g., some requests require the content server to perform some data processing on the content dataset and to respond to the request with a result of that data processing). In such examples, the content service handover includes configuring the ad hoc server to enable the ad hoc server to also respond to the multiple types of requests that clients use to request the content dataset and/or data associated with the content dataset. For instance, in an example, configuring the ad hoc server includes configuring the ad hoc server to identify a request type of a request for the content dataset from a group of possible request types and configuring the ad hoc server to provide a service associated with the identified request type from a group of possible services in response to the request of the identified request type.

At 310, the content server provides a new server notification to the DNS indicating that the identified ad hoc server is ready to serve the content dataset. In some examples, the new server notification includes identifying information (e.g., network address information) of the ad hoc server that enables the DNS to route clients to the ad hoc server when the clients request access to the content dataset. Further, the DNS is configured to record the identifying information of the ad hoc server in association with servers that are configured to serve the content dataset and/or to prioritize the identifying information of the ad hoc server over corresponding identifying information of the content server, such that clients that would normally be routed to the content server are routed to the ad hoc server instead. Thus, the content server is protected from being overloaded with client requests through the configuration and use of the ad hoc server in serving the content dataset.

Additionally, or alternatively, in some examples, the content server monitors its own current server load and, upon determining that its current server load is below the server load threshold, the content server notifies the DNS of its current server load. In response to the notification, the DNS is configured to route client traffic associated with the content dataset to the content server again. Further, the ad hoc server is released from its service as an ad hoc server for the content server. Alternatively, in some examples, the content server continues to periodically send current server load notifications to the DNS and the DNS determines when client traffic should be routed to the content server again based at least in part on the server load threshold.

Figure 4:
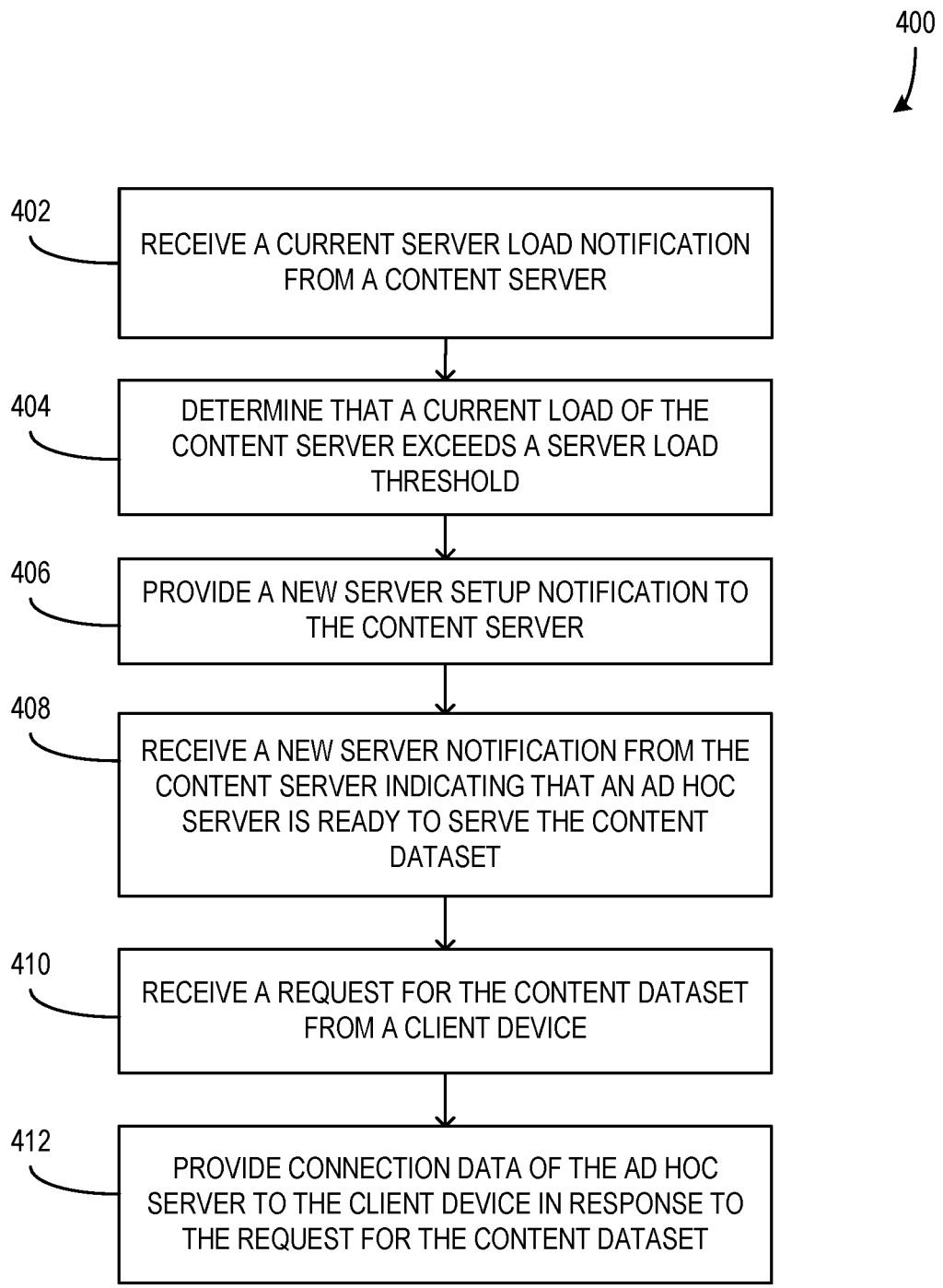
FIG. 4 is a flowchart illustrating a method for monitoring content server loads and triggering the configuration of an ad hoc server based thereon by a DNS.

FIG. 4 is a flowchart illustrating a method 400 for monitoring content server (e.g., content server 104) loads and triggering the configuration of an ad hoc server (e.g., ad hoc server 116) based thereon by a DNS (e.g., DNS 102). In some examples, the method 400 is executed or otherwise performed in a system such as system 100 of FIG. 1 and/or by a DNS such as DNS 102 of FIG. 1.

At 402, the DNS receives a current server load notification from a content server. In some examples, the current server load notification includes an indication of the current server load of the content server as described herein. Further, in some examples, the DNS periodically receives current server load notifications from multiple content servers and performs method 400 for each of those multiple content servers as described herein.

At 404, the DNS determines that the current load of the content server exceeds a server load threshold. In some examples, the determination includes comparing current server load data from the current server load notification to the server load threshold.

At 406, the DNS provides anew server setup notification to the content server.

In some examples, the sending of the new server setup notification is triggered by receiving a client request for access to the content dataset served by the content server while the current load of the content server meets or exceeds the server load threshold as determined by the DNS.

At 408, the DNS receives a new server notification from the content server indicating that the ad hoc server is ready to serve the data content. In some examples, the new server notification includes address information and/or other identifying information of the ad hoc server that the DNS uses to route client traffic to the ad hoc server. Further, in some examples, if the DNS has any waiting client requests for access to the content dataset, the DNS routes the clients associated with those client requests to the ad hoc server upon receiving the new server notification.

At 410, the DNS receives a request for the content dataset from a client device. Because the ad hoc server is active and/or the current server load of the content server meets or exceeds the server load threshold based on the data stored by the DNS, at 412, the DNS provides connection data of the ad hoc server to the requesting client device. Thus, the requesting client device is enabled to connect to the ad hoc server and request access to the content dataset and/or other services related to the content dataset.

Additionally, or alternatively, the method 400 includes the following operations: receiving, by a domain name server (DNS), a current server load notification from a content server configured to serve a content dataset; determining, by the DNS, that a current load of the content server exceeds a server load threshold using the received current server load notification; providing, by the DNS, a new server setup notification to the content server based at least in part on the current load of the content server exceeding the server load threshold; receiving, by the DNS, a new server notification from the content server indicating that an ad hoc server is ready to serve the content dataset; receiving, by the DNS, a request for the content dataset from a client device; and providing, by the DNS, connection data of the ad hoc server to the client device in response to the request for the content dataset, whereby the DNS prevents the content server from being overtaxed by the received request for the content dataset.

Figure 5:
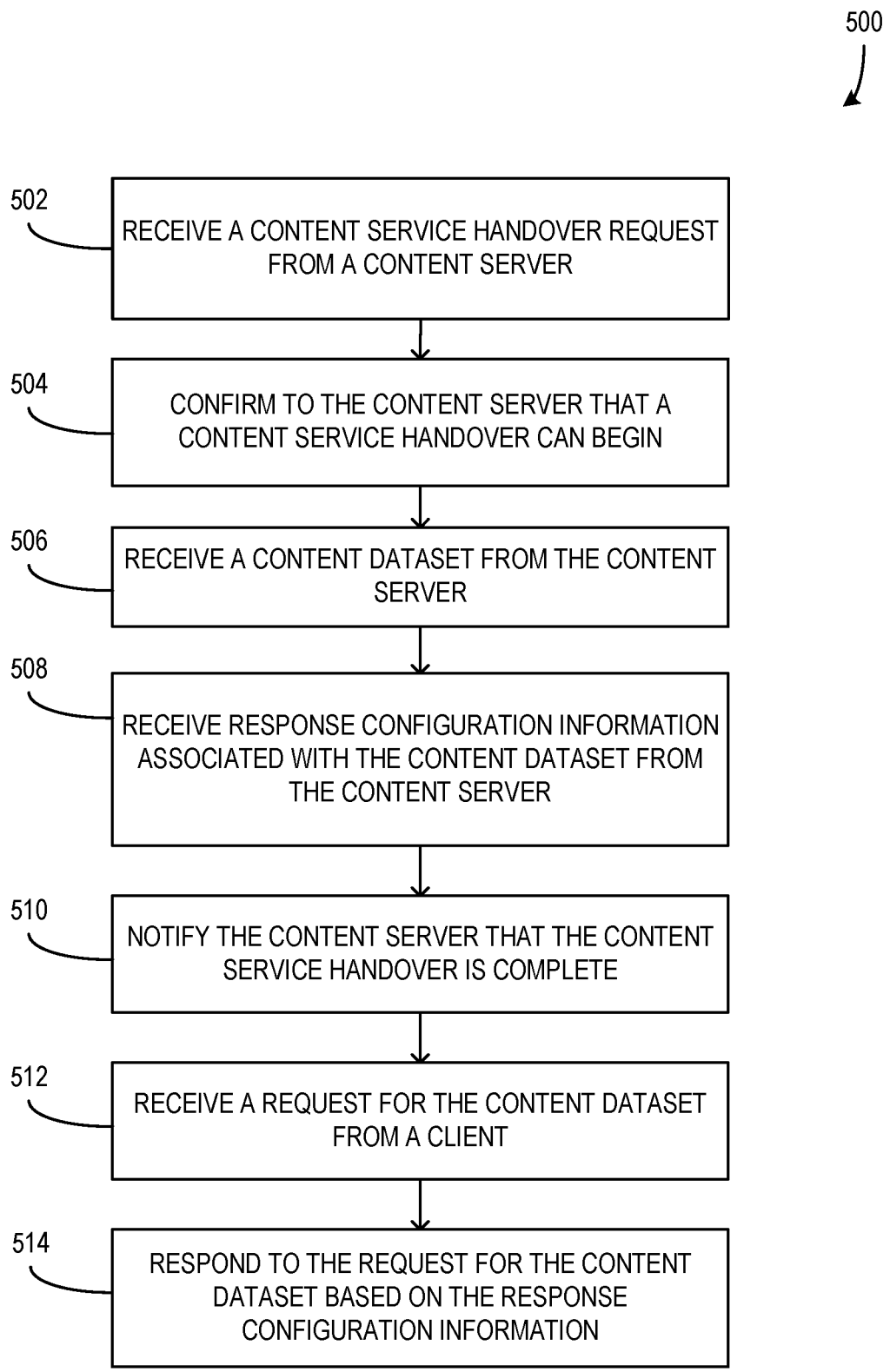
FIG. 5 is a flowchart illustrating a method for enabling, by an ad hoc server, the ad hoc server to be configured to serve content by a content server.

FIG. 5 is a flowchart illustrating a method 500 for enabling, by an ad hoc server (e.g., ad hoc server 116), the ad hoc server to be configured to serve content (e.g., a content dataset 114) by a content server (e.g., content server 104). In some examples, the method 500 is executed or otherwise performed in a system such as system 100 of FIG. 1 and/or by an ad hoc server such as ad hoc server 116 of FIG. 1.

At 502, the ad hoc server receives a content service handover request from a content server and, at 504, the ad hoc server confirms to the content server that a content service handover can begin. In some examples, the ad hoc server performs a check to confirm that it has the capability to operate as an ad hoc server of the content server. For instance, the ad hoc server confirms that it has sufficient bandwidth and/or other resources to perform the role of ad hoc server for the content server. Further, in some examples, the content service handover request includes data that indicates requirements associated with serving as an ad hoc server for the content server and the ad hoc server uses that included data to determine whether it is currently capable of being an ad hoc server for the content server.

At 506, the ad hoc server receives a content dataset from the content server and, at 508, the ad hoc server receives response configuration information associated with the content dataset from the content server. In some examples, the ad hoc server processes the response configuration information in such a way that the ad hoc server is configured to respond to requests associated with the content dataset in the manner that the content server responds to such requests.

At 510, the ad hoc server notifies the content server that the content service handover is complete. Thus, the ad hoc server is ready to operate as an ad hoc server for the content server.

At 512, the ad hoc server receives a request for the content dataset or otherwise associated with the content dataset from a client and, at 514, the ad hoc server responds to the request for the content dataset based on the response configuration information provided by the content server. Thus, the response to the client is the same as a response from the content server would be to the same client request.

Exemplary Operating Environment

Figure 6:
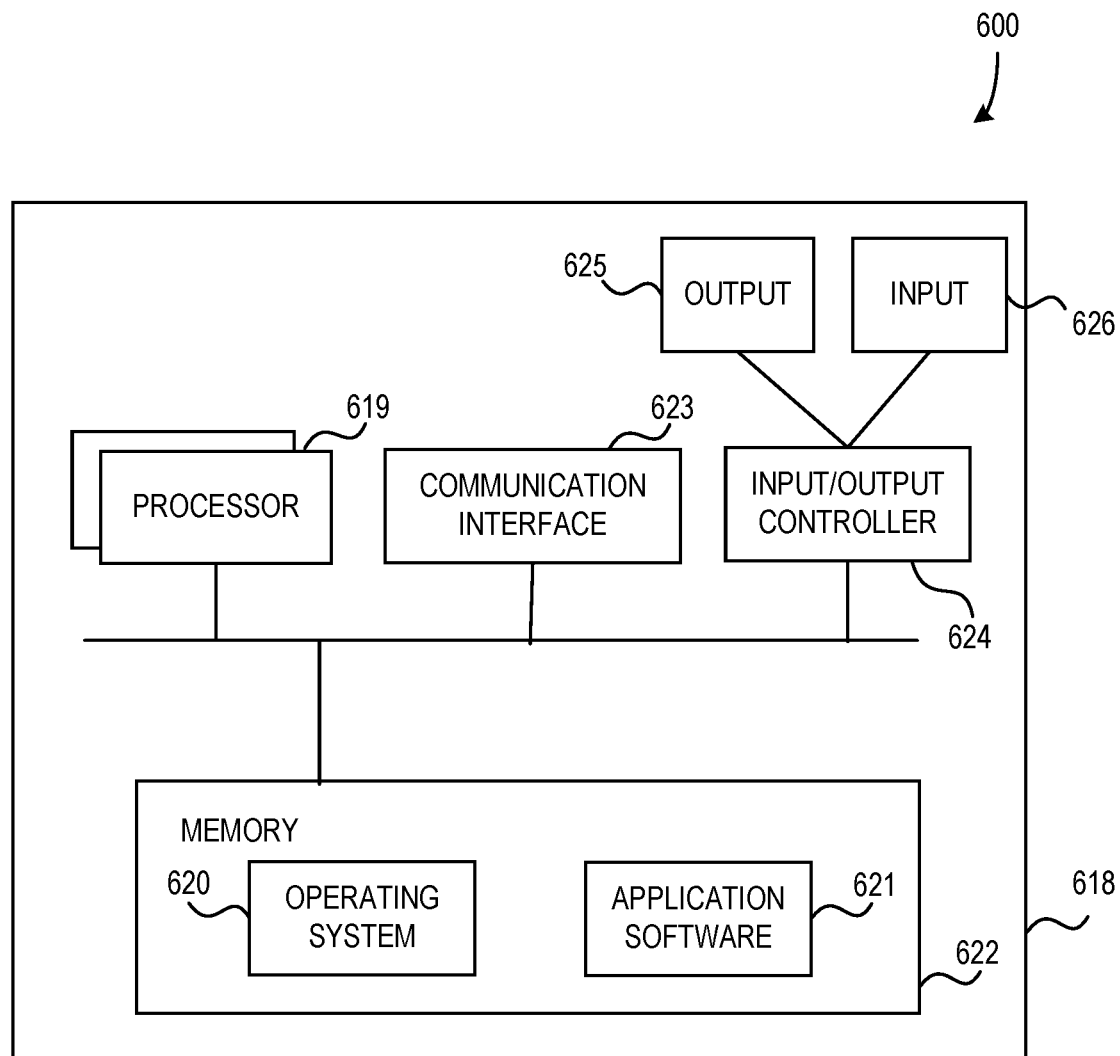
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, configuring and using ad hoc servers to serve content to and prevent content servers from being overloaded with requests as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium does not include a propagating signal. Propagated signals are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: provide, by a content server configured to serve a content dataset, a current server load notification to a domain name server (DNS); receive, by the content server, a new server setup notification based at least in part on the provided current server load notification including an indication that a current load of the content server exceeds a server load threshold; identify, by the content server, an ad hoc server; perform, by the content server, a content service handover to the identified ad hoc server; and provide, by the content server, a new server notification to the DNS indicating that the identified ad hoc server is ready to serve the content dataset, whereby the DNS is enabled to divert client requests for the content dataset to the identified ad hoc server during a period that the current load of the content server exceeds the server load threshold.

An example computerized method comprises providing, by a content server configured to serve a content dataset, a current server load notification to a domain name server (DNS); receiving, by the content server, a new server setup notification based at least in part on the provided current server load notification including an indication that a current load of the content server exceeds a server load threshold; identifying, by the content server, an ad hoc server; performing, by the content server, a content service handover to the identified ad hoc server; and providing, by the content server, a new server notification to the DNS indicating that the identified ad hoc server is ready to serve the content dataset, whereby the DNS is enabled to divert client requests for the content dataset to the identified ad hoc server during a period that the current load of the content server exceeds the server load threshold.

One or more computer storage media having computer-executable instructions that, upon execution by a processor, case the processor to at least: provide, by a content server configured to serve a content dataset, a current server load notification to a domain name server (DNS); receive, by the content server, a new server setup notification based at least in part on the provided current server load notification including an indication that a current load of the content server exceeds a server load threshold; identify, by the content server, an ad hoc server based on at least one ad hoc server requirement, wherein the identified ad hoc server has available server load capacity; perform, by the content server, a content service handover to the identified ad hoc server; and provide, by the content server, a new server notification to the DNS indicating that the identified ad hoc server is ready to serve the content dataset, whereby the DNS is enabled to divert client requests for the content dataset to the identified ad hoc server during a period that the current load of the content server exceeds the server load threshold.

Alternatively, or in addition to the other examples described herein, examples include any combination of the following:

wherein identifying the ad hoc server includes: determining a group of potential ad hoc servers; filtering the group of potential ad hoc servers into a subset of potential ad hoc servers using at least one requirement associated with the content dataset; and identifying the ad hoc server in the subset of potential ad hoc servers based on at least one performance characteristic of the ad hoc server.

wherein the content server is located in a geographic region and the at least one performance characteristic of the ad hoc server includes a proximity of the ad hoc server to the geographic region.

wherein performing the content service handover to the identified ad hoc server includes: providing the content dataset to the content server; and configuring the ad hoc server to respond to requests for the content dataset.

wherein configuring the ad hoc server to respond to requests for the content dataset includes: configuring the ad hoc server to identify a request type of a request for the content dataset from a group of possible request types; and configuring the ad hoc server to provide a service associated with the identified request type from a group of possible services in response to the request of the identified request type.

wherein providing the current server load notification to the DNS includes: monitoring, by the content server, the current load of the content server; and periodically sending, by the content server, the current server load notification to the DNS including the monitored current load of the content server.

comprising: determine, by the content server, that the current load of the content server is below the server load threshold; and send, by the content server, a notification to the DNS that the current load of the content server is below the server load threshold, whereby the DNS is enabled to route client requests for the content dataset to the content server and the ad hoc server is enabled to be freed of its ad hoc server role with respect to the content dataset of the content server.

wherein providing the current server performance notification to the DNS includes: monitoring, by the content server, the current performance metric of the content server, wherein the current performance metric is indicative of at least latency of the content server over a time period; and periodically sending, by the content server, the current server performance notification to the DNS including the monitored current performance metric of the content server.

further comprising: determine, by the content server, that the current performance metric of the content server is below the server performance threshold; and send, by the content server, a notification to the DNS that the current performance metric of the content server is below the server performance threshold, whereby the DNS is enabled to route client requests for the content dataset to the content server and the ad hoc server is enabled to be freed of its ad hoc server role with respect to the content dataset of the content server.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for providing, by a content server configured to serve a content dataset, a current server load notification to a domain name server (DNS); exemplary means for receiving, by the content server, a new server setup notification based at least in part on the provided current server load notification including an indication that a current load of the content server exceeds a server load threshold; exemplary means for identifying, by the content server, an ad hoc server; exemplary means for performing, by the content server, a content service handover to the identified ad hoc server; and exemplary means for providing, by the content server, a new server notification to the DNS indicating that the identified ad hoc server is ready to serve the content dataset, whereby the DNS is enabled to divert client requests for the content dataset to the identified ad hoc server during a period that the current load of the content server exceeds the server load threshold.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory comprising computer program code, the memory and the computer program code configured to cause the processor to:
   provide, by a content server configured to serve a content dataset in a geographical region, a current server load notification to a domain name server (DNS) indicating that a current load of the content server exceeds a server load threshold;
   receive, by the content server, a new server setup notification based at least in part on the current server load notification;
   identify, by the content server in response to receiving the new server setup notification, an ad hoc server located in proximity to the geographic region to provide overflow capacity for the content server;
   perform, by the content server, a content service handover of the content dataset to the ad hoc server; and
   provide, by the content server, a new server notification to the DNS indicating that the ad hoc server is ready to serve the content dataset, wherein the new server notification prompts the DNS to divert future client requests for the content dataset originating from the geographical region to the ad hoc server during a period that the current load of the content server exceeds the server load threshold, and wherein the content server continues to serve the content dataset to previous client request from the geographical region that were received prior to the period.

2. The system of claim 1, wherein identifying the ad hoc server includes:
   determining a group of potential ad hoc servers;
   filtering the group of potential ad hoc servers into a subset of potential ad hoc servers using at least one requirement associated with the content dataset; and
   identifying the ad hoc server in the subset of potential ad hoc servers based on at least one performance characteristic of the ad hoc server.

3. The system of claim 2, wherein the content server is located in a geographic region and the at least one performance characteristic of the ad hoc server includes a proximity of the ad hoc server to the geographic region.

4. The system of claim 1, wherein performing the content service handover to the ad hoc server includes:
   providing the content dataset to the content server; and
   configuring the ad hoc server to respond to requests for the content dataset.

5. The system of claim 4, wherein configuring the ad hoc server to respond to requests for the content dataset includes:
   configuring the ad hoc server to identify a request type of a request for the content dataset from a group of possible request types; and
   configuring the ad hoc server to provide a service associated with the identified request type from a group of possible services in response to the request of the identified request type.

6. The system of claim 1, wherein providing the current server load notification to the DNS includes:
   monitoring, by the content server, the current load of the content server; and periodically sending, by the content server, the current server load notification to the DNS including the current load of the content server.

7. The system of claim 1, wherein the memory and the computer program code are configured to further cause the processor to:
   determine, by the content server, that the current load of the content server is below the server load threshold; and
   send, by the content server, a notification to the DNS that the current load of the content server is below the server load threshold, whereby the DNS is enabled to route client requests for the content dataset to the content server and the ad hoc server is enabled to be freed of its ad hoc server role with respect to the content dataset of the content server.

8. A computerized method comprising:
   providing, by a content server configured to serve a content dataset in a geographical region, a current server load notification to a domain name server (DNS) indicating that a current load of the content server exceeds a server load threshold;
   receiving, by the content server, a new server setup notification based at least in part on the current server load notification;
   identifying, by the content server in response to receiving the new server setup notification, an ad hoc server located in proximity to the geographic region to provide overflow capacity for the content server;
   performing, by the content server, a content service handover of the content dataset to the ad hoc server; and
   providing, by the content server, a new server notification to the DNS indicating that the ad hoc server is ready to serve the content dataset, wherein the new server notification prompts the DNS to divert future client requests for the content dataset originating from the geographical region to the ad hoc server during a period that the current load of the content server exceeds the server load threshold, and wherein the content server continues to serve the content dataset to previous client request from the geographical region that were received prior to the period.

9. The computerized method of claim 8, wherein identifying the ad hoc server includes:
   determining a group of potential ad hoc servers;
   filtering the group of potential ad hoc servers into a subset of potential ad hoc servers using at least one requirement associated with the content dataset; and
   identifying the ad hoc server in the subset of potential ad hoc servers based on at least one performance characteristic of the ad hoc server.

10. The computerized method of claim 9, wherein the content server is located in a geographic region and the at least one performance characteristic of the ad hoc server includes a proximity of the ad hoc server to the geographic region.

11. The computerized method of claim 8, wherein performing the content service handover to the ad hoc server includes:
   providing the content dataset to the content server; and
   configuring the ad hoc server to respond to requests for the content dataset.

12. The computerized method of claim 11, wherein configuring the ad hoc server to respond to requests for the content dataset includes:
   configuring the ad hoc server to identify a request type of a request for the content dataset from a group of possible request types; and
   configuring the ad hoc server to provide a service associated with the identified request type from a group of possible services in response to the request of the identified request type.

13. The computerized method of claim 8, wherein providing the current server load notification to the DNS includes:
   monitoring, by the content server, a current performance metric of the content server, wherein the current performance metric is indicative of at least latency of the content server over a time period; and
   periodically sending, by the content server, the current server load notification to the DNS including the current performance metric of the content server.

14. The computerized method of claim 8, further comprising:
   determining, by the content server, that a current performance metric of the content server is below a server performance threshold; and
   sending, by the content server, a notification to the DNS that the current performance metric of the content server is below the server performance threshold, whereby the DNS is enabled to route client requests for the content dataset to the content server and the ad hoc server is enabled to be freed of its ad hoc server role with respect to the content dataset of the content server.

15. A computer storage medium has computer-executable instructions that, upon execution by a processor, cause the processor to at least:
   provide, by a content server configured to serve a content dataset in a geographical region, a current server load notification to a domain name server (DNS) indicating that a current load of the content server exceeds a server load threshold;
   receive, by the content server, a new server setup notification based at least in part on the current server load notification;
   identify, by the content server in response to receiving the new server setup notification an ad hoc server located in proximity to the geographic region to provide overflow capacity for the content server;
   perform, by the content server, a content service handover of the content dataset to the ad hoc server; and
   provide, by the content server, a new server notification to the DNS indicating that the ad hoc server is ready to serve the content dataset, wherein the new server notification prompts the DNS to divert future client requests for the content dataset originating from the geographical region to the hoc server during a period that the current load of the content server exceeds the server load threshold, and wherein the content server continues to serve the content dataset to previous client request from the geographical region that were received prior to the period.

16. The computer storage medium of claim 15, wherein identifying the ad hoc server includes:
   determining a group of potential ad hoc servers;
   filtering the group of potential ad hoc servers into a subset of potential ad hoc servers using at least one requirement associated with the content dataset; and
   identifying the ad hoc server in the subset of potential ad hoc servers based on at least one performance characteristic of the ad hoc server.

17. The computer storage medium of claim 16, wherein the content server is located in a geographic region and the at least one performance characteristic of the ad hoc server includes a proximity of the ad hoc server to the geographic region.

18. The computer storage medium of claim 15, wherein performing the content service handover to the ad hoc server includes:
   providing the content dataset to the content server; and
   configuring the ad hoc server to respond to requests for the content dataset.

19. The computer storage medium of claim 18, wherein configuring the ad hoc server to respond to requests for the content dataset includes:
   configuring the ad hoc server to identify a request type of a request for the content dataset from a group of possible request types; and
   configuring the ad hoc server to provide a service associated with the identified request type from a group of possible services in response to the request of the identified request type.

20. The computer storage medium of claim 15, wherein providing the current server load notification to the DNS includes:
   monitoring, by the content server, the current load of the content server; and
   periodically sending, by the content server, the current server load notification to the DNS including the current load of the content server.

\* \* \* \* \*